(12) United States Patent
Weingart et al.

(10) Patent No.: US 8,544,495 B1
(45) Date of Patent: *Oct. 1, 2013

(54) DISPENSER FOR LIQUID AND/OR SOLID CHEMICALS

(71) Applicants: Ronald C. Weingart, Agoura, CA (US); Robert Gooch, Thousand Oaks, CA (US)

(72) Inventors: Ronald C. Weingart, Agoura, CA (US); Robert Gooch, Thousand Oaks, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/665,103

(22) Filed: Oct. 31, 2012

(51) Int. Cl.
B05B 7/26 (2006.01)
B05B 7/28 (2006.01)
F17D 1/00 (2006.01)

(52) U.S. Cl.
USPC ........... 137/268; 422/264; 239/310; 239/317; 239/318

(58) Field of Classification Search
USPC .............. 137/268; 422/264; 285/134.1, 197; 138/95; 239/310, 317, 318
See application file for complete search history.

(56) References Cited

U.S. PATENT DOCUMENTS

| 3,929,151 | A | * | 12/1975 | Rubin ........................... 137/268 |
| 4,250,910 | A | | 2/1981 | King |
| 4,846,403 | A | | 7/1989 | Mivelaz |
| 4,898,202 | A | | 2/1990 | Craig |
| 4,971,091 | A | | 11/1990 | Ho |
| 5,010,912 | A | | 4/1991 | Riding |
| 5,178,181 | A | | 1/1993 | Craig |
| 5,666,987 | A | | 9/1997 | Combs |
| 5,730,364 | A | | 3/1998 | Gertie |
| 5,823,430 | A | | 10/1998 | Clark, Jr. et al. |
| 6,173,732 | B1 | | 1/2001 | Davis et al. |
| 6,680,026 | B1 | * | 1/2004 | Denkewicz et al. .......... 137/268 |
| 7,690,392 | B1 | | 4/2010 | Sarkiss |
| 8,210,451 | B1 | | 7/2012 | Gooch et al. |
| 8,409,434 | B2 | * | 4/2013 | Andrews et al. ......... 210/167.11 |

* cited by examiner

Primary Examiner — Kevin Lee
(74) Attorney, Agent, or Firm — Albert O. Cota

(57) ABSTRACT

A dispenser (10) for liquid and/or solid chemicals consisting of a reservoir (20), an inlet line (40) and an outlet line (44) both connected into the reservoir. A saddle (52) attaches to an external fluid supply line with inlet and the inlet lines interfacing with the reservoir. A press-in inlet nozzle (64) is disposed in the fluid inlet line and enters upstream into the fluid supply line and a press-in outlet nozzle (66) is attached into the fluid outlet line entering downstream into the fluid supply line. A saddle clamp (76) attaches the saddle enclosing the external fluid supply line, such that when a fluid flows downstream through the fluid supply line the inlet nozzle receives a portion of the flow through velocity ram induction and is introduced into the reservoir where it mixes with liquid and/or solid chemicals, forming a suspended solution. The solution is drawn from the reservoir with negative pressure created by the downstream facing outlet nozzle positioned within the flow stream, thereby permitting the solution to mix with the supply fluid in a controlled volume manner according to a selected nozzle configuration. Different nozzle spacing, types, combinations, and the use of either nozzle alone use permit the manipulation of fluid flow volume and speed of dispersal.

20 Claims, 4 Drawing Sheets

DISPENSER FOR LIQUID AND/OR SOLID CHEMICALS

TECHNICAL FIELD

The invention generally pertains to chemical dispensers, and more specifically to a dispenser for a liquid or a solid chemical that is dispensed into a previously piped fluid system.

BACKGROUND ART

The prior art disclosed below is basically for distributing chemicals particularly fertilizer and the like however the instant invention is for use in any basic fluid system, such as air or liquid which includes any applicable substance, including insecticides, herbicides, weed killer and the like. Nevertheless maintaining healthy growth and appearance of various plants, such as vegetables, herbs, grass, shrubs, trees, lawns, and flowers require periodic watering. When fertilizer or other chemicals are used in combination with the water the health and the growth along with the appearance of the plants is greatly enhanced.

Many chemicals particularly fertilizer may be purchased as a liquid, a powder or in the form of a solid such as a table for pellets. The powdered fertilizer is typically spread by hand, is placed into a mechanical or electric spreader. The liquid fertilizer can be sprayed or placed into a container that is attached in-line with a watering hose. When water is flowing, the water stream causes a partial vacuum that sucks up the liquid fertilizer into the water stream. The fertilizer tablets or pellets are typically applied by scattering them over the area surrounding the plants. After the area is watered the water causes the tablet or pellets to disintegrate, which in turn causes the chemical composition in the tablet or pellets to seep into the soil. The pellets or tablets can also be inserted into a container that is located in the path of the water stream, which causes the tablets or pellets to disintegrate into the water stream. The use of tablets or pellets has proven to be an economical, convenient and safe method for fertilizing plants.

Various designs of additive dispensers have been issued to provide an effective means for dispensing water soluble chemicals. However, when compared to the instant invention, the prior art inventions are relatively complex, cumbersome to use and are not as cost effective as the instant invention.

A search of the prior art did not disclose any literature or patents that possess the novelty of the instant invention however the following U.S. patents are considered related:

| Pat. No. | Inventor | Issue Date |
| --- | --- | --- |
| 4,250,910 | King | Feb. 17, 1981 |
| 4,846,403 | Mivelaz | Jul. 11, 1989 |
| 4,898,202 | Craig | Feb. 6, 1990 |
| 4,971,091 | Ho | Nov. 20, 1990 |
| 5,010,912 | Riding | Apr. 30, 1991 |
| 5,178,181 | Craig | Jan. 12, 1993 |
| 5,666,987 | Combs | Sep. 16, 1997 |
| 5,823,430 | Clark, Jr. et al. | Oct. 20, 1998 |
| 6,173,732 | Davis et al. | Jan. 16, 2001 |
| 7,690,392 | Sarkiss | Apr. 6, 2010 |
| 8,210,451 | Gooch et al. | Jul. 3, 2012 |

King in U.S. Pat. No. 4,250,910 discloses an apparatus for dissolving a solid in a liquid flowing through a liquid line. A tank for holding the solid to be dissolved is in fluid contact with the liquid line utilizing an intake line and a return line. A hand operated valve and a flow meter are connected in-line with the intake line.

U.S. Pat. No. 4,846,403 issued to Mivelaz is for an automatic additive dispenser and system which includes a container attached to a housing with a device to rupture a seal, thereby allowing the additive to enter a flow of water through the housing. Bottle additives are prevented from entering the system until the seal is ruptured.

U.S. Pat. No. 4,898,202 of Craig teaches an applicator for solid fertilizer that is suspended in a holder in a water pressurization chamber attached to a sprinkler line system. A diluted solution is passed into the sprinkler system for application to vegetation.

Ho in U.S. Pat. No. 4,971,091 discloses a dispenser for irrigation chemicals. The dispenser includes a vacuum breaker with two levels of valves for preventing backflow and permitting the dispensing of a chambered cartridge of chemicals into the water flow.

U.S. Pat. No. 5,010,912 issued to Riding discloses a container for solid fertilizer pellets having an inlet and an outlet disposed into a water supply pipe. A formation on the outlet pipe co-acts with the supply stream to aid in circulating water through the container and over the fertilizer pellets.

Craig in U.S. Pat. No. 5,178,181 teaches a fertilizer applicator that employs a container with internal inlet and outlet tubes. Water is fed through an inlet-outlet tube into the bottom of the container where a solid or liquid fertilizer is dissolved, thus forming a concentrate solution. The solution is diluted with water coming through an inlet-outlet tube, which includes a venturi, the size of which controls the flow rate.

U.S. Pat. No. 5,666,987 issued to Combs is for a device that disperses solid, powder, or a tablet of liquid of chemicals into a pressurized liquid stream that treats living or growing vegetation. The device includes an upright vertical cylindrical container having internal screens.

U.S. Pat. No. 5,823,430 of Clark, Jr. et al. discloses an automatic fertilizer system for introducing liquid fertilizer, insecticide, and herbicide type chemicals into outside water-line sprinklers. An adjustable metering cap allows injection of the contents into the sprinkler water stream.

Davis, et al. in U.S. Pat. No. 6,173,732 teaches a chemical feeding system for adding liquid or water soluble solid chemicals into a lawn sprinkler system, either above or below ground level. The system has one or two vertically oriented mixing chambers containing a filter.

U.S. Pat. No. 7,690,392 issued to Sarkiss discloses a mixing body for diverting a portion of liquid into a cartridge of chemical, thereby forming an effluent that is introduced into a water flow downstream within a sprinkler system. The cartridge, which contains a liquid concentrate, is inserted into the mixing body, which has an inlet and an outlet with one way valves that puncture a sealing layer of the cartridge. The effluent can be regulated by a needle valve that controls the volume.

Gooch et al. in U.S. Pat. No. 8,210,451 discloses a chemical dispenser which is connected directly to a sprinkler system. A saddle clamp attaches to a mains utility water line and has openings for water inlet and water discharge with an outlet nozzle extending into the mains water line. A reservoir with an open top spout, cap and basket permit a solid chemical to form an aqueous solution which is drawn by a pressure differential into the water line. A metering/shut-off valve is connected within the solution discharge line to control fluid volume and closure.

For background purposes and as indicative of the art to which the invention is related, reference may be made to the remaining cited patents issued to Gertie in U.S. Pat. No. 5,730,364 and Palmer in U.S. Pat. No. 6,969,011.

DISCLOSURE OF THE INVENTION

The dispenser for liquid and/or solid chemicals may be used with most liquid or gas fluid systems. Therefore, the dispenser is limitless as the function remains constant as long as a fluid flow is supplied. The dispenser utilizes the principle of pressure differential which allows a portion of the fluid from the fluid supply line to be captured and flow into a container into which a chemical has been added. The mixed blend is then drawn back into the fluid supply line through negative pressure creeled by a downstream velocity.

The invention may be used in large scale agricultural applications including overhead watering of crops in farms. However, the most practical application of the dispenser is in a conventional automatic watering system using sprinklers that cover a given area such as an irrigation system for plants or lawns that are wittered by a sprinkler system above or below ground level using spray beads. These systems are in common usage throughout the world for homes, offices, parks, golf courses, commercial buildings, road medians and parkways, etc.

Chemicals may include any type of fertilizer, pesticide, weed killer, and insecticides, etc. can be purchased as a liquid, a powder or in the form of a solid such as a tablet or pellets. The powdered chemical fertilizer is typically spread by hand. The liquid chemical may be added to the water where the flow stream causes a partial vacuum that draws the liquid into the water stream.

The chemical tablets or pellets arc typically applied by scattering them over the area surrounding the plants. After the area is watered the tablets or pellets disintegrate, which in turn causes the chemical composition in the tablets or pellets to seep into the soil. The pellets or tablets can also be inserted into a container that is located in the path of the water stream, which causes the tablets or pellets to disintegrate into the water stream. The use of tablets or pellets has proven to be an economical, convenient and safe method for fertilizing vegetation.

Application of these chemicals creates a problem in that the manufacturing and logistics require the chemicals to be concentrated and, for application, the chemicals must be diluted with water to be effective without over treatment perhaps even lolling the vegetation. The solution is to add the chemical when the normal watering is occurring, such as by adding a bottle containing a liquid or solid chemical attached to a hose. When a fixed sprinkler system is used, either below or above ground, the piping system must include a device to add the chemical at the time the pipes are installed.

Prior art has developed at least three different approaches: the first includes a container for the chemical having a side entrance and a bottom exit connection, the second adds additional piping to the existing system to create a face and bypass arrangement, and the third is an in-line arrangement requiring the severing of a supply line that is adjacent to a vacuum breaker valve and adding the dispensing apparatus in line. The problem becomes more difficult when a watering system has already been installed and is in use.

This long-felt problem of utilizing a watering system that includes a chemical has been solved by the instant invention. Therefore the primary object of the invention is to in use the operating principle of pressure differential in a stream of fluid to permit part of the fluid to be drawn from the stream and mixed with a chemical and then discharged back into the fluid supply line.

An important object of the invention is with the method of flow volume control which is necessary depending upon the size of the area involved. In large fluid systems a metering valve is required such as the metering/shut-off valve used in the applicant's previously issued U.S. Pat. No. 8,210,451. Smaller systems for home and commercial lawn watering using a mains utility water or external fluid supply line having a nominal diameter of one inch or less, thereby permitting the metering valve to be eliminated. The function is replaced by the use of nozzles and an assortment of combinations of varying degrees of nozzle openings which create the optimum pressure differential and volume control. The nozzles function not only in the combinations of various intake and discharge nozzles but also separately with a variety of nozzles acting alone. The flush cut nozzle, if used, may be employed when either the intake or discharge nozzle is used alone. An intake nozzle facing upstream employed utilizing ram induction to create higher inlet pressure boosting the pressure differential. A discharge nozzle faces downstream and when water flows past the nozzle low pressure is created, drawing the discharge water from a reservoir with a chemical solution furthering the pressure differential. It is understood that the discharge nozzle acting alone without the intake nozzle permits the invention to function properly as in the prior art teachings.

Another object of the invention is that the nozzle configuration may be selected by the manufacturer or may be chosen by the user at the time of the installation. A myriad of nozzle configurations may be used, however it has been found through experimentation that there some preferred configurations which include the distal end severed with a curved cut, a baloney cut, a baloney cut with bent tip or a flush cut. It will be noted that the flush cut is sized so that it does not protrude into the water stream, as it is flush with the inside of the sprinkler pipe and may actually be eliminated altogether using the drilled hole in the sprinkler pipe for the nozzle opening.

The nozzles are metal, with stainless steel being preferred, with the dispenser containing a saddle in which the fluid supply and discharge lines each have a nozzle recess permitting the nozzles to be inserted and/or removed in combination to reach the optimal flow for the particular application.

The nozzles are preferably made of metal because of strength, corrosion reduction, and ease of insertion and removal. However, the nozzles may be made of any material including a thermoplastic molded in place or as one piece.

Still another object of the invention permits the installer to place a metallic template over the fluid supply line and drill two holes through the template with a hand drill using a pilot-hole sized drill bit followed by a larger diameter drill bit. The invention incorporates a saddle which is placed over the fluid supply line directly downstream of a vacuum breaker and shut-off valve of a conventional sprinkler system. A press-in upwardly facing intake nozzle is disposed in the fluid supply line and receives part of the fluid flow by velocity ram induction. The supply fluid flows into the reservoir where it mixes with either liquid or solid chemicals, forming a solution which is drawn from the reservoir near the bottom surface. Negative pressure is created by a downstream facing outlet nozzle placed in the flow stream and connected directly to the fluid outlet line, thereby permitting the solution to mix with the fluid for treating plants. The integral saddle is fastened in place with a saddle clamp using cap screws.

Yet another object of the invention is to provide a dispenser that can be installed without the assistance of professional help. The only tools required to install the dispenser are a hand drill, standard diameter drill bits and a hex wrench capable of tightening hex head cap screws.

A further object of the invention is the ease of use, as a lid may be removed and the solid chemical product in the form of granules, pellets or powder can be transferred into a basket and the lid replaced. However when a liquid chemical is used the liquid is poured directly into the reservoir. If a basket is supplied the basket may remain, as it is impervious to most of the chemicals used in the application. The dispenser may be manufactured either with or without a cleanout sump and the basket may be supplied as an accessory.

An advantage of the invention is the employment of a standpipe configuration in the discharge line which is directed upward from the saddle and U-turned downward into the container. This advantage prevents a liquid chemical to be drained out of the reservoir while filling, while prior art requires a valve of some type for the same purpose.

An important point of the invention is its cost effectiveness, as the entire assembly including the reservoir lines and saddle may be integrally formed of thermoplastic resin using a blow molding process allowing the cost of the dispenser to be well within the reach of the masses.

As there are different sized main utility water or fluid supply lines for home and commercial lawn watering, the dispenser saddle can be any size, however the most common is the one-inch nominal diameter. A three-quarter nominal diameter line may be used with a resilient spacer having two clearance holes for receiving the inlet nozzle and outlet nozzle. The spacer permits a fluid line having a smaller outer diameter to be utilized with the dispenser.

A further point of the invention is the ability to restore the fixed sprinkler system to its original condition by removing the dispenser and covering the holes drilled in the main utility water or fluid supply line with a supplied flat gasket and a saddle clamp.

Finally, the invention allows the use of different nozzle spacing, types and combinations, permitting the manipulation of the amount of fluid flow and speed of dispersal. The pressure differential may be produced solely by the high pressure upstream nozzle ram effect or by a combination utilizing the low pressure downstream nozzle suction effect providing the requisite flow and speed.

These and other objects and advantages of the present invention will become apparent from the subsequent detailed description of a preferred and second embodiment and the appended claims taken in conjunction with the accompanying drawings.

BEST MODE FOR CARRYING OUT THE INVENTION

Figures 4, 5:
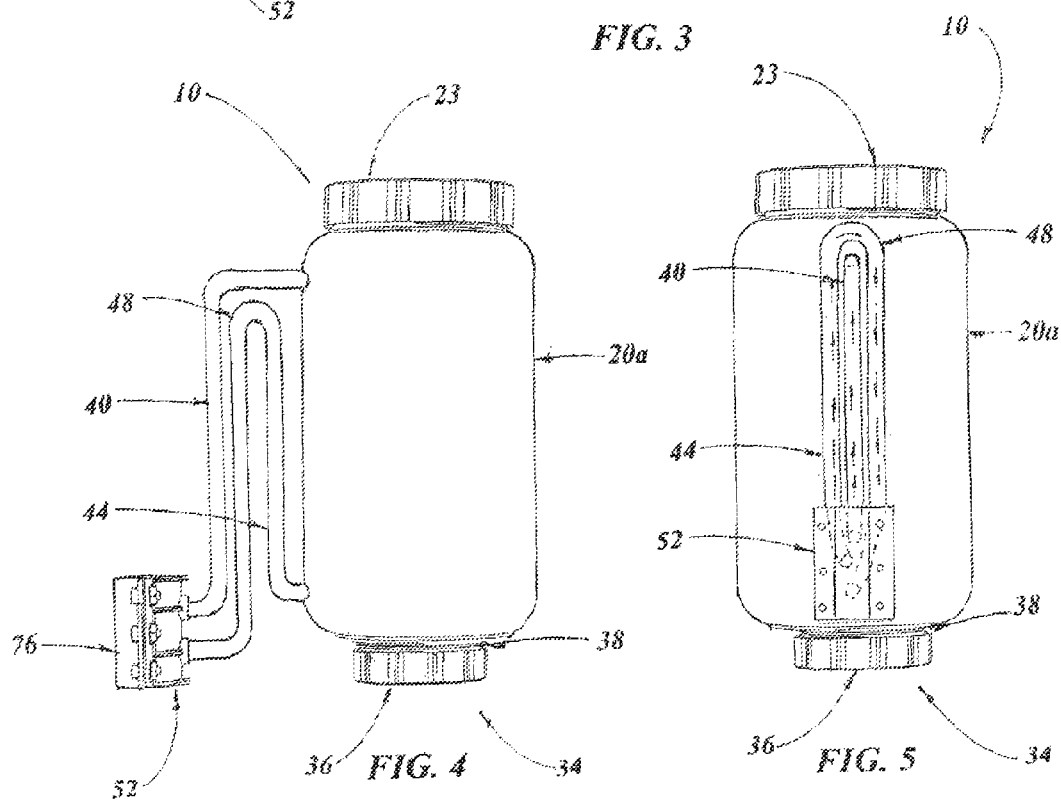
FIG. 4 is a side view of the dispenser for liquid and/or solid chemicals in an embodiment having a cylindrical reservoir with a radiused top and bottom, a strainer inside the reservoir and a cleanout on the bottom having an attached sump cap and sump gasket.
FIG. 5 is an end view of the dispenser for liquid and/or solid chemicals with the fluid inlet line and solution outlet line having separate tubes attached together externally and to both the reservoir and the saddle.
Figure 6:
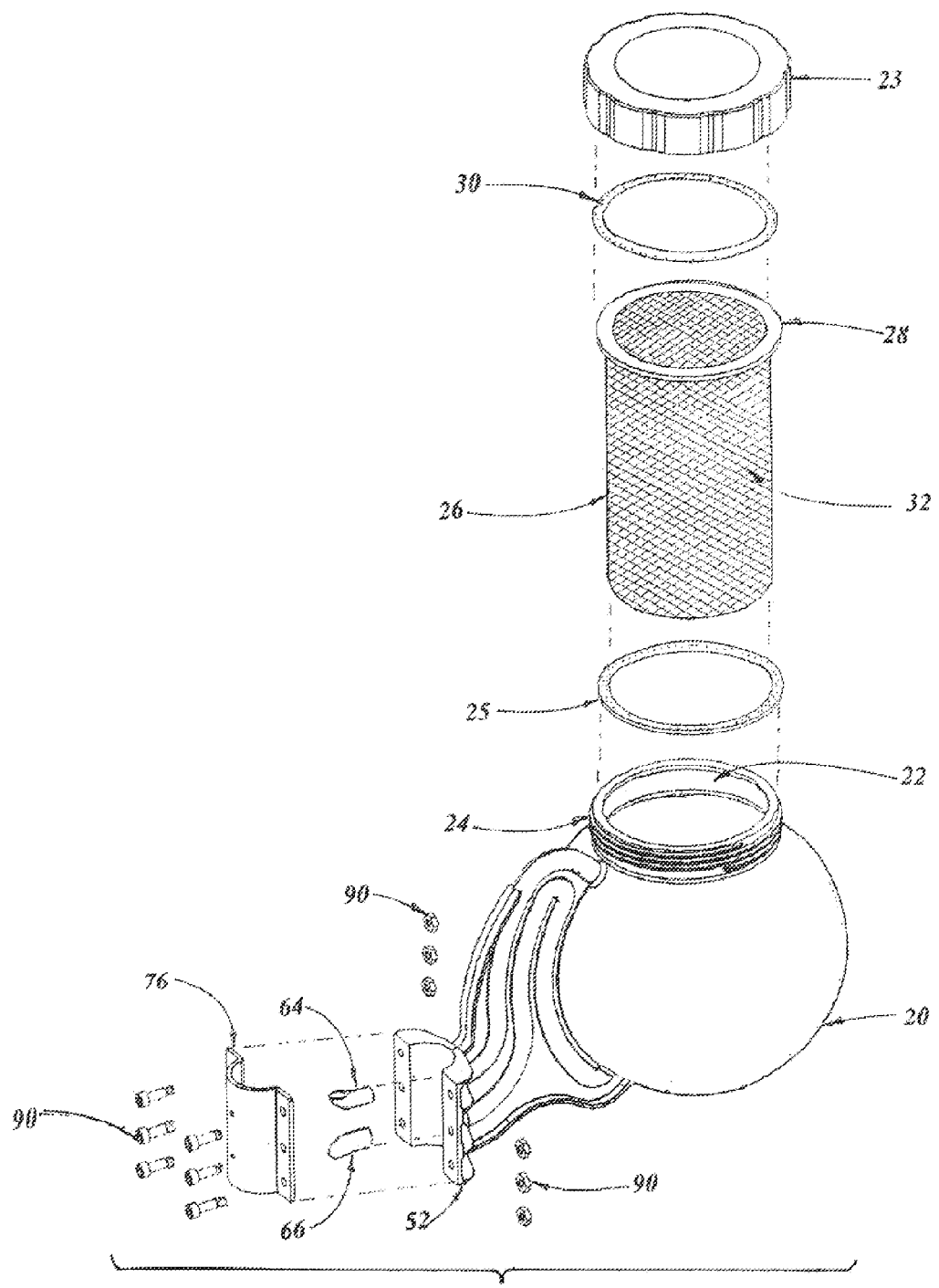
FIG. 6 an exploded view of the preferred embodiment of the dispenser for liquid and/or solid chemicals.
Figure 7:
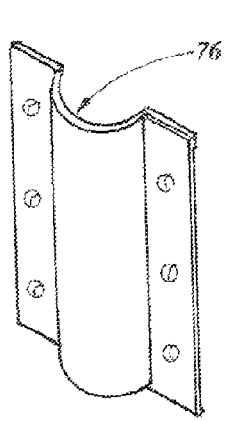
FIG. 7 is a partial isometric view of the saddle clamp.

The best mode for carrying out the invention is presented in terms that disclose a preferred embodiment of a dispenser for liquid and/or solid chemicals 10. As shown in FIGS. 1 through 17, the dispenser 10 is comprised of a spherical shaped reservoir 20 having an open spout 22 with external male threads 24, a spout cap 23 and a spout gasket 25 on the top surface of the reservoir 20 permitting chemicals to be inserted therein. While the spherical shape of the reservoir 20 is preferred, as illustrated in FIGS. 1-3 and 6, a cylindrical shape 20a having a radiused top and a radiused bottom, as shown in FIGS. 4 and 5, may utilized with equal utility and effectiveness. The reservoir material is preferably molded thermoplastic, however a metal composition may also be a viable substitute.

The open spout 22 permits most common chemicals to be inserted, however when solid chemicals such as tablets or pellets are used it is necessary to provide a removable basket 26, preferably with a flange 28 and a flange gasket 25 with a plurality of restrictive openings 32 of an adequate size to retain the solid chemicals therein when dissolving in a fluid. When solid chemicals are used residue may remain in the bottom of the reservoir 20, therefore a clean-out sump 34 on a bottom surface may be required along with an attached sump cap 36 and a sump gasket 38.

A fluid inlet line 40 is connected into the reservoir 20 adjacent a top surface 42 and a solution outlet line 44 is connected into the reservoir 20 near a bottom surface 46 for containing a chemical in solution with the fluid. The solution outlet line 44 incorporates an inverted U-shaped stand pipe 48 configured to permit chemicals to be added to the reservoir 20 without escaping from the reservoir solution outlet line 44 prior to operation.

FIGS. 1-4 illustrate the fluid inlet line 40 and the solution outlet line 44 including the stand pipe 48 that are joined within a reinforcing web 50 integrally formed with the reservoir 20. Alternatively, the fluid inlet line 40 and solution outlet line 44 with the stand pipe 48 each comprise a separate tube which are attached together and are positioned external from the reservoir 20, as illustrated in FIG. 5.

Figure 1:
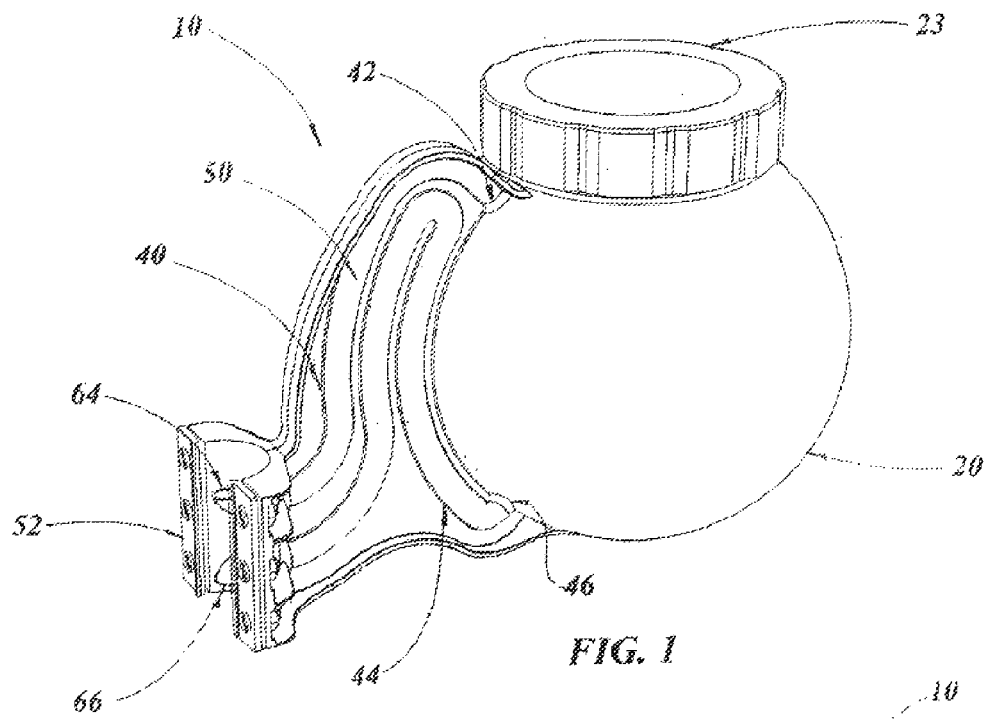
FIG. 1 is an isometric view of the dispenser for liquid and/or solid chemicals less the saddle clamp and attaching hardware, in the preferred embodiment.
Figure 2:
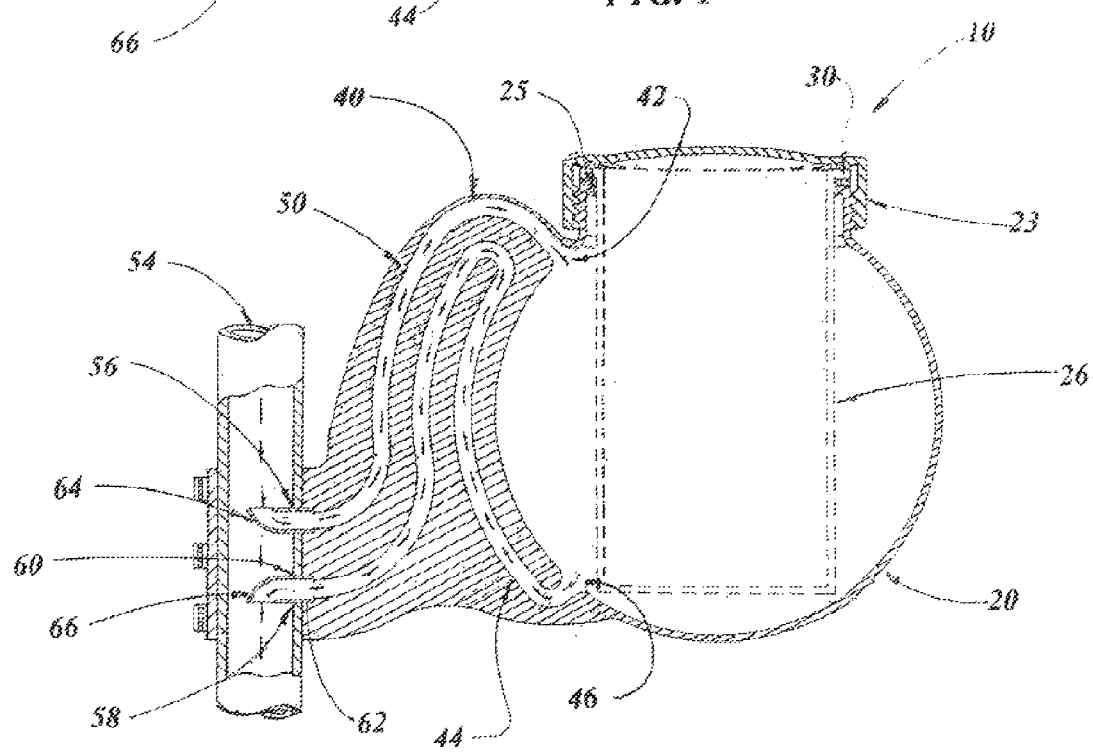
FIG. 2 is a cross-sectional view taken along an imaginative centerline of the chemical dispenser along with a section of the fluid supply line enclosed within the saddle clamp, in the preferred embodiment.
Figure 3:
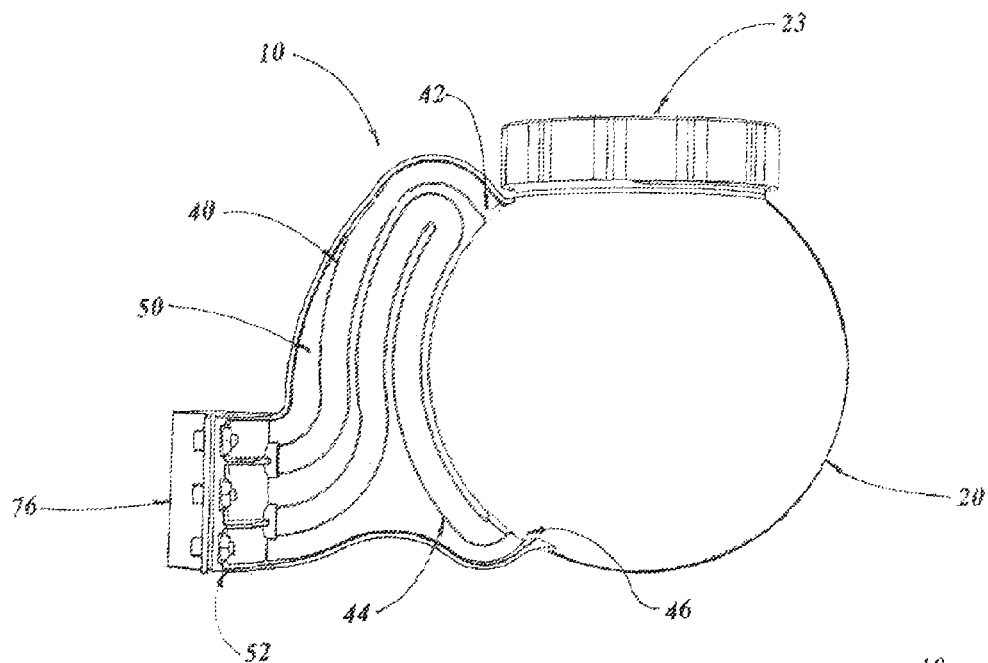
FIG. 3 is a side view of the dispenser for liquid and/or solid chemicals including the saddle clamp and mounting hardware, in the preferred embodiment.

A saddle 52 is attached directly to an existing external fluid supply line 54, as shown in FIG. 2, preferably just below the present sprinkler valve as there is no pressure until the valve is actuated permitting the addition of chemicals. The fluid supply line 54 has an inlet bore 56 and an outlet bore 58. The saddle 52 has a first nozzle recess 60 connected to the fluid inlet line 40 and a second nozzle recess 62 connected to the solution outlet line 44. The fluid inlet line 40 interfaces with the reservoir 20 adjacent the top surface 42, and the solution outlet line 44 interfaces with the reservoir 20 adjacent the bottom surface 46.

An inlet nozzle that preferably consists of a press-in inlet nozzle 64 disposed within the first nozzle recess 60 interfaces with the existing fluid supply line 54, and an nozzle that preferably consists of a press-in outlet nozzle 66 disposed within the second nozzle recess 62 also interfaces with the existing fluid supply line 54, as depicted in FIG. 2. The inlet nozzle 64 and outlet nozzle 66 are preferably made of a metal including stainless steel, chromium plated steel, copper, brass and titanium, with stainless steel preferred. The inlet nozzle 64 and outlet nozzle 66 have their distal end severed with a curved cut 68, a baloney cut 70, a baloney cut with bent tip 72, or a flush cut 74, as illustrated in FIGS. 14-17. Alternately the nozzles 64 may be molded in place as part of the saddle 52, however metal press-in nozzles 64 have many advantages as they may be configured to obtain the desired flow rate and are stronger, corrosion resistant and easily replaced. The metal press-in nozzles may be threaded and screwed into the first nozzle recess 60 and second nozzle recess 62. The curved cut nozzle 68 can have an angular cut similar to the baloney cut 70. Varying the angle on either nozzle shape is used to regulate flow rate as either an intake or a discharge nozzle.

A saddle clamp 76 is attached to the saddle 52 enclosing the external fluid supply line 54. When a fluid flows downstream through the existing fluid supply line 54 the upwardly facing inlet nozzle 64 receives a portion of flow through velocity ram induction and is introduced into the reservoir 20 adjacent the top surface 42 where it mixes with previously introduced liquid and/or solid chemicals, forming a suspended solution.

The suspended solution is drawn from the reservoir 20 near the bottom surface 46 with negative pressure created by the downwardly facing outlet nozzle 66 in the existing fluid supply flow stream permitting the solution to mix with the existing supply line fluid in a controlled manner according to selected nozzle configurations.

Figure 8:
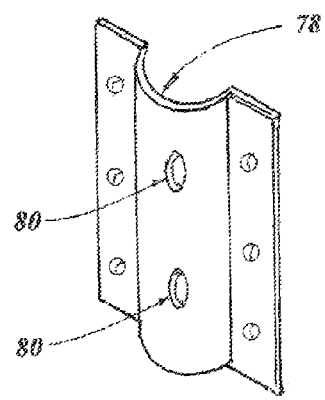
FIG. 8 is a partial isometric view of the template clamp having pilot holes therein the preferred embodiment.
Figure 9:
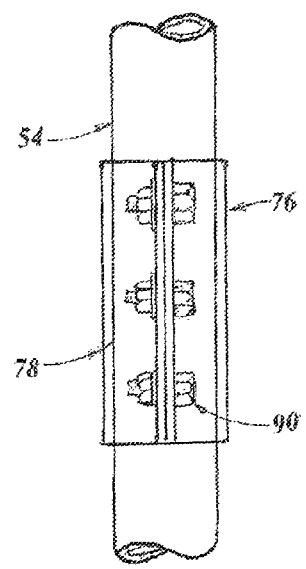
FIG. 9 is a partial side view of the template and saddle clamp, including a flat gasket, fastened together with threaded fasteners around a fluid supply line when the dispenser has been removed.
Figure 10:
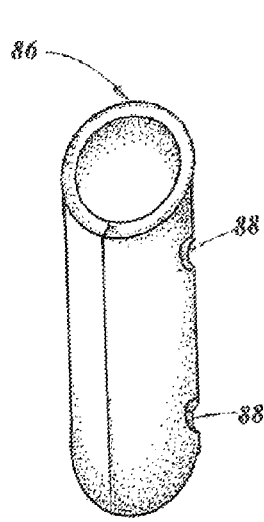
FIG. 10 is a partial isometric view of the spacer for use with a smaller outer diameter fluid supply line.
Figure 11:
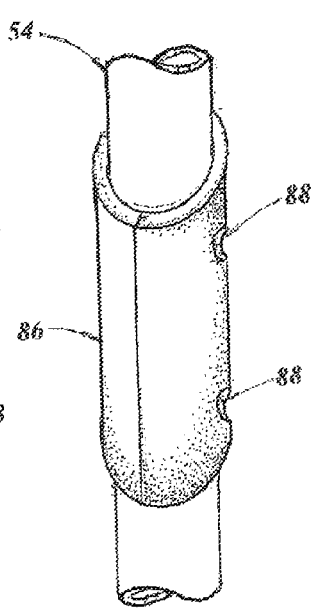
FIG. 11 is a partial isometric view of the spacer covering the outer diameter of a fluid supply line.
Figure 12:
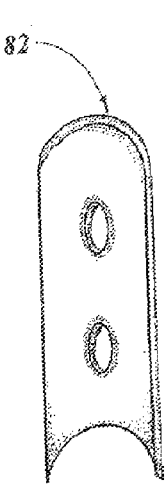
FIG. 12 is a partial isometric view a flat gasket configured to be positioned between the saddle and the fluid inlet line.

A template 78, as illustrated in FIG. 8, has two pilot holes 80 for locating the inlet bore 56 and the outlet bore 58. The template is first used to locate the holes/bores 56 and 58 on the supply line 54 so that the dispenser can be installed on the supply line. The second use of the template is when the dispenser 20 is removed to cover half of the fluid supply line 54 with the saddle clamp 76 on the opposite side, as depicted in to FIG. 9.

Figure 13:
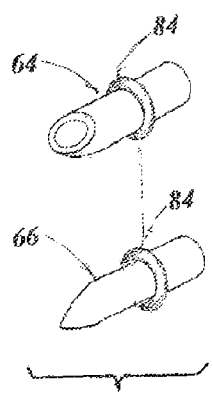
FIG. 13 is an isometric view of a pair of O-rings on the inlet and outlet nozzles as an alternate for the flat gasket.
Figure 14:
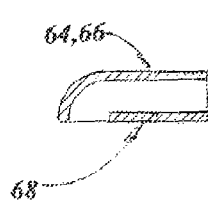
FIG. 14 is a cross-sectional view of a metal inlet or outlet nozzle having a curved cut.
Figure 15:
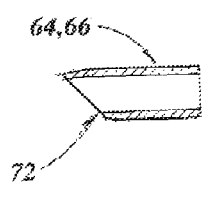
FIG. 15 is a cross-sectional view of a metal inlet or outlet nozzle having a 45° bent cut.
Figure 16:
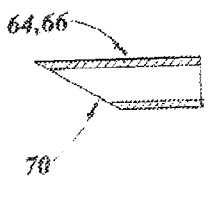
FIG. 16 is a cross-sectional view of a metal inlet or outlet nozzle having a baloney cut.
Figure 17:
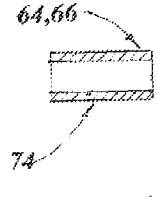
FIG. 17 is a cross-sectional view of a metal inlet or outlet nozzle having a flush cut.

A flat gasket 82, shown in FIG. 13, is configured to be positioned between the saddle 52 and the fluid supply line 54. When the dispenser is removed the flat gasket 82 may also be used between the fluid supply line 54 aligned with the bores 56 and 58 and the saddle clamp 76. As an alternate, an O-ring 84 may be disposed onto the inlet nozzle 64 for sealing between the saddle 52 and the fluid supply line 54, likewise a second O-ring 84 may be attached over the outlet nozzle 66 for sealing between the saddle 52 and the fluid supply line 54. FIG. 13 illustrates the pair of O-rings 84 attached on each nozzle.

A spacer 86 having two clearance holes 88 therein receive the inlet nozzle 64 and outlet nozzle 66. The spacer 86 interfaces with the saddle clamp 76 and the saddle 52, thereby permitting a fluid supply line 54 having a smaller outer diameter to be utilized with the dispenser 10. The spacer 86 is made of a resilient material for sealing purposes.

A plurality of threaded fasteners 90 attach the saddle 52 to the saddle clamp 76, securely retaining the fluid supply line 54 therebetween, as illustrated in FIGS. 2-4 and 6.

While the invention has been described in detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A dispenser for liquid and/or solid chemicals comprising:

a reservoir, a fluid inlet line connecting into the reservoir, a solution outlet line connecting into the reservoir near a bottom surface and a saddle for attachment directly to an external fluid supply line, with the fluid inlet line interfacing with both the reservoir and the saddle, the solution outlet line interfacing with both the reservoir and the saddle, an inlet nozzle is disposed in the fluid inlet line as well as into the fluid supply line, an outlet nozzle is disposed in the fluid outlet line entering downstream into the fluid supply line, wherein a saddle clamp is attached to the saddle enclosing the external fluid supply line such that when a fluid flows downstream through the fluid supply line the inlet nozzle receives a portion of the flow through velocity ram induction and is introduced into the reservoir where it mixes with liquid and/or solid chemicals, forming a suspended solution that is drawn from the reservoir with negative pressure created by the downstream-facing outlet nozzle positioned within the flow stream, thereby permitting the solution to mix with the supply fluid in a controlled volume according to a selected nozzle configuration.

2. A dispenser for liquid and/or solid chemicals comprising:
 a) a reservoir having an open top spout permitting chemicals to be inserted therein,
 b) a fluid inlet line connecting into the reservoir adjacent an upper surface,
 c) a solution outlet line connecting into the reservoir near a bottom surface for containing a chemical in solution with a fluid,
 d) a saddle for attachment directly to an external fluid supply line having an inlet and an outlet bore, with the saddle having a first nozzle recess connected to an existing fluid inlet line and a second nozzle recess connected to the solution outlet line, with the fluid inlet line interfacing with the reservoir and the fluid inlet line interfacing with the reservoir,
 e) an inlet nozzle disposed within the first nozzle recess entering into the fluid supply line,
 f) an outlet nozzle disposed within the second nozzle recess entering into the fluid supply line, and
 g) a saddle clamp attached to the saddle enclosing the external fluid supply line such that when a fluid flows downstream through the fluid supply line, the inlet nozzle receives a portion of the flow through velocity ram induction and is introduced into the reservoir where it mixes with liquid and/or solid chemicals, forming a suspended solution that is drawn from the reservoir near with negative pressure created by the outlet nozzle positioned in the flow stream, thereby permitting the solution to mix with the supply fluid in a controlled volume according to a selected nozzle configuration.

3. A dispenser for liquid and/or solid chemicals comprising:
   a) a reservoir having a capped open top spout within an uppermost surface of said reservoir permitting chemicals to be inserted therein,
   b) a fluid inlet line connecting into said reservoir adjacent a top surface thereof,
   c) a solution outlet line connecting into said reservoir near a bottom surface thereof for containing a chemical in solution with fluid, said solution outlet line having an inverted U-shaped stand pipe which permits chemicals to be added to said reservoir preventing escape from said reservoir solution outlet line prior to operation,
   d) a saddle for attachment directly to an existing external fluid supply line having an inlet bore and an outlet bore, with said saddle having a first nozzle recess connected to said fluid inlet line and a second nozzle recess connected to said solution outlet line, with said fluid inlet line interfacing with said reservoir adjacent a top surface and said solution outlet line interfacing with said reservoir adjacent a bottom surface,
   e) a metal press-in upwardly facing inlet nozzle disposed within said first nozzle recess interfaces with said fluid supply line,
   f) a metal press-in downwardly facing outlet nozzle disposed within said second nozzle recess interfaces with said fluid outlet line, and
   g) a saddle clamp attached to said saddle for enclosing said external fluid supply line such that when a fluid flows downstream through said fluid supply line said upwardly facing inlet nozzle receives a portion of the flow through velocity ram induction and is introduced into said reservoir where it mixes with liquid and/or solid chemicals, previously introduced, forming a suspended solution where the solution is drawn from said reservoir near a bottom surface with negative pressure created by said downwardly facing outlet nozzle in said external fluid supply flow stream, thereby permitting said solution to mix within said external supply fluid in a controlled manner according to selected nozzle configurations.

4. The dispenser for liquid and/or solid chemicals as recited in claim 3 wherein said reservoir has a spherical shape.

5. The dispenser for liquid and/or solid chemicals as recited in claim 3 wherein said reservoir has a cylindrical shape with a radiused top and a radiused bottom.

6. The dispenser for liquid and/or solid chemicals as recited in claim 3 wherein said reservoir having a clean-out sump on a bottom surface along with an attached sump cap and a sump gasket.

7. The dispenser for liquid and/or solid chemicals as recited in claim 3 wherein said reservoir having a basket disposed therein with the basket having a flange and a flange gasket.

8. The dispenser for liquid and/or solid chemicals as recited in claim 7 wherein said basket having a plurality of restrictive openings that retain solid chemicals therein.

9. The dispenser for liquid and/or solid chemicals as recited in claim 3 wherein the reservoir material is selected from the group consisting of a molded thermoplastic, and a metal composition.

10. The dispenser for liquid and/or solid chemicals as recited in claim 3 wherein said fluid inlet line, solution outlet line and saddle are joined within a reinforcing web integrally formed with said reservoir.

11. The dispenser for liquid and/or solid chemicals as recited in claim 3 wherein said fluid inlet line and said solution outlet line each comprise a separate tube attached together externally to said reservoir and said saddle.

12. The dispenser for liquid and/or solid chemicals as recited in claim 3 wherein said inlet nozzle and said outlet nozzle are made of a metal selected from the group consisting of stainless steel, chromium plated steel, copper, brass and titanium.

13. The dispenser for liquid and/or solid chemicals as recited in claim 3 wherein said metal inlet nozzle and said metal outlet nozzle have a distal end cut from the group consisting of a curved cut, a baloney cut, a baloney cut with bent tip and flush cut.

14. The dispenser for liquid and/or solid chemicals as recited in claim 3 wherein said saddle clamp is metal having a radial center and outwardly extending flanges on each vertical side.

15. The dispenser for liquid and/or solid chemicals as recited in claim 3 wherein said saddle clamp forming a template having two pilot holes for locating said inlet bore and said outlet bore.

16. The dispenser for liquid and/or solid chemicals as recited in claim 3 further comprising a flat gasket configured to be positioning between said saddle and said fluid supply line.

17. The dispenser for liquid and/or solid chemicals as recited in claim 3 further comprising an O-ring disposed onto said inlet nozzle for sealing between said saddle and said fluid supply line, and an O-ring disposed onto said outlet nozzle for sealing between said saddle and said fluid supply line.

18. The dispenser for liquid and/or solid chemicals as recited in claim 3 further comprising a spacer having two clearance holes therein for receiving said inlet nozzle and said outlet nozzle, such that said spacer interfaces with said saddle clamp and said saddle, therefore permitting a fluid supply line having a smaller outer diameter to be utilized with the dispenser.

19. The dispenser for liquid and/or solid chemicals as recited in claim 18 wherein said spacer is made of a resilient material.

20. The dispenser for liquid and/or solid chemicals as recited in claim 3 further comprising a plurality of threaded fasteners attaching said saddle to said saddle clamp, securely retaining said fluid supply line therebetween.

* * * * *